July 25, 1933.  H. A. DOUGLAS  1,919,208
SWITCHING MECHANISM FOR AUTOMOTIVE VEHICLES
Filed Jan. 25, 1930  2 Sheets-Sheet 1
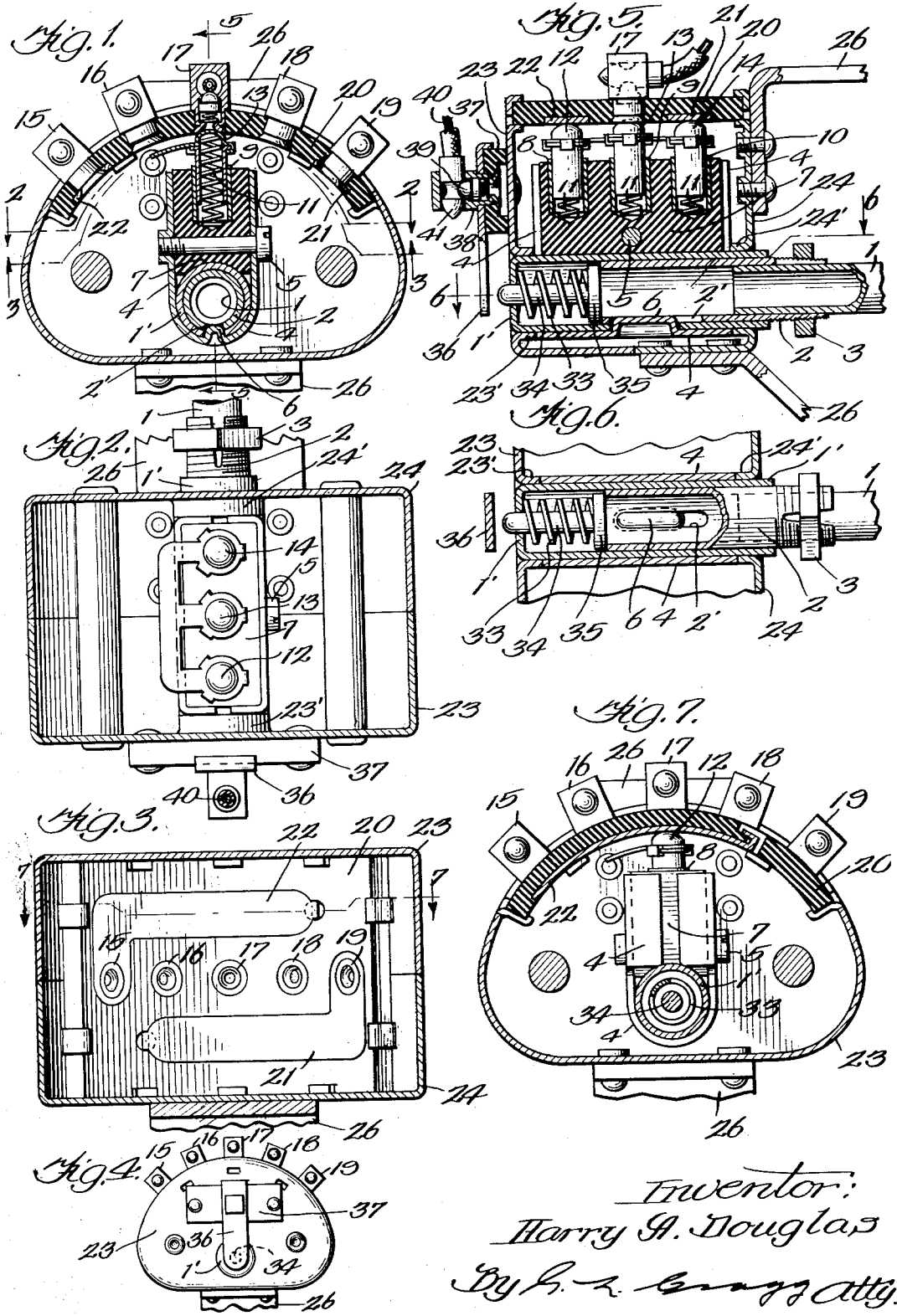

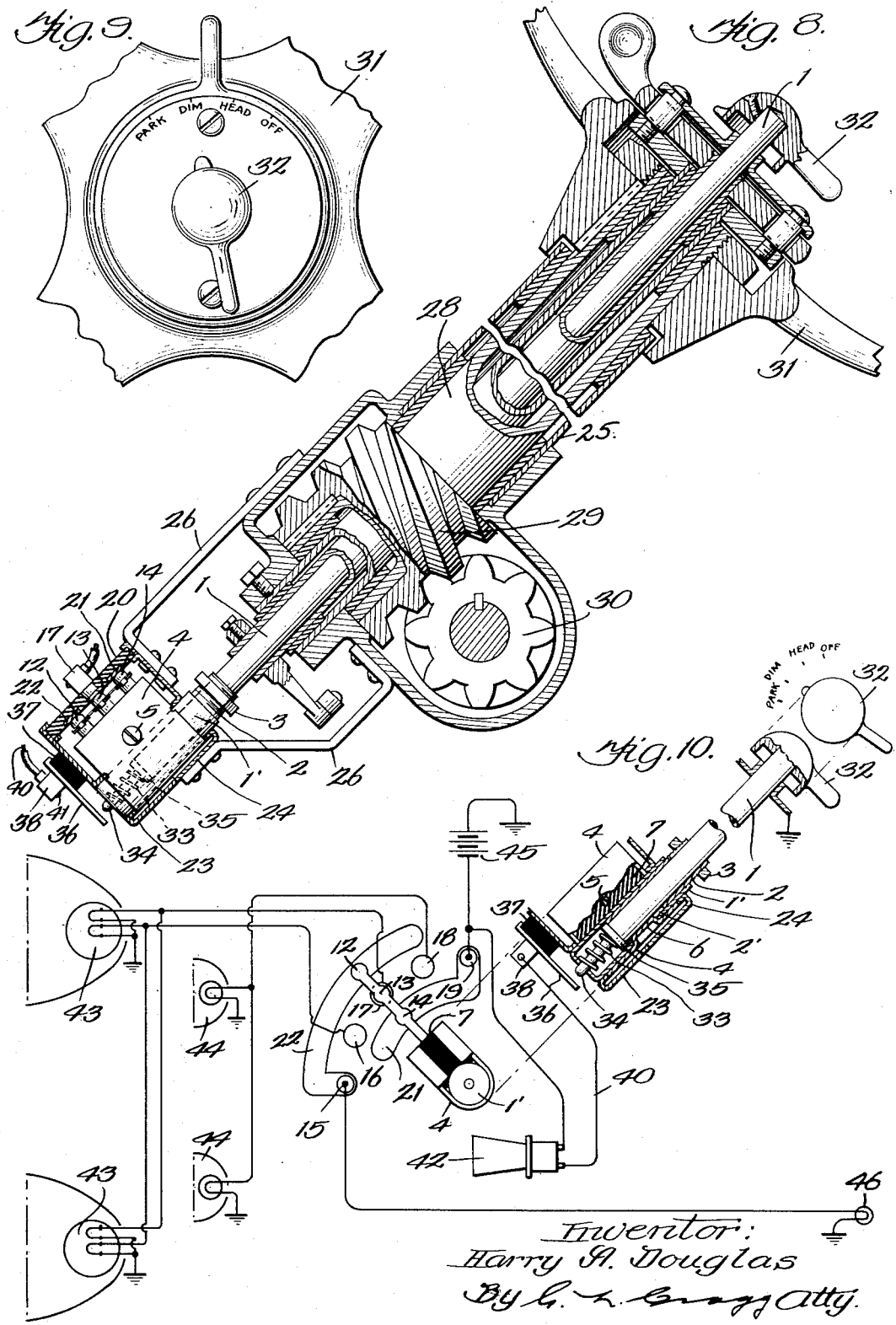

Patented July 25, 1933

1,919,208

UNITED STATES PATENT OFFICE

HARRY A. DOUGLAS, OF BRONSON, MICHIGAN

SWITCHING MECHANISM FOR AUTOMOTIVE VEHICLES

Application filed January 25, 1930. Serial No. 423,414.

My invention relates to automotive vehicles and electrical circuits associated therewith. In carrying out my invention I assemble the switching mechanism controlling the circuits of an automotive vehicle with the lower end of the stationary steering column and in a position to be free from access of foreign matter. I provide a casing for the switching mechanism, this casing being located upon the upper side of the steering column axis and the upper side of the switch operating shaft that passes through the steering column and steering shaft. This casing is desirably inclusive of an arcuate contact carrying wall portion which is coaxial with the switch operating shaft that carries the contact or contacts that are complementary to contacts upon this wall portion. The switch operating shaft may be hollow or solid. It is made of metal and is arranged to form a part of the electromagnetic horn circuit when employed to operate the horn. This switch operating shaft is given longitudinal movement by being pushed upon at the steering hand wheel. This shaft may be also turned to control the lighting circuits. It is depressible to operate the horn in all the positions to which it is turned.

The invention will be more fully explained in connection with the accompanying drawings in which Fig. 1 is a cross sectional view illustrating the preferred form of switching mechanism; Fig. 2 is a sectional view on line 2—2 of Fig. 1; Fig. 3 is a sectional view on line 3—3 of Fig. 1; Fig. 4 is an end view; Fig. 5 is a sectional view on line 5—5 of Fig. 1; Fig. 6 is a sectional view on line 6—6 of Fig. 5; Fig. 7 is a sectional view on line 7—7 of Fig. 3; Fig. 8 is a longitudinal sectional view taken throughout the length of the steering column with a portion of a column and contiguous parts broken away for lack of space, some parts being shown in elevation; Fig. 9 is an end view taken in the region of the hand operated steering wheel; and Fig. 10 is a diagrammatic illustration of one circuit arrangement.

The switch operating mechanism illustrated is inclusive of a rotatable inclined metallic switch actuating shaft 1 having a tubular metallic extension 2 receiving the lower end of the shaft 1 and which is clamped into assembly with this shaft by means of a clamping nut 3 which is screwed upon the tapered longitudinally split end portion of the sleeve 2 where this sleeve surrounds said shaft. A contact actuating U shaped clip 4 embraces the sleeve 2. A clamping screw 5 is passed through the sides of the clip and is screw threaded into the side of the clip that is remote from the head of the screw, whereby the clip is gripped upon the sleeve to be turned therewith as the shaft 1 is turned. The base of the clip is desirably formed with a key 6 which enters an opening 2' formed through the sleeve 2, whereby rotation of the clip is further assured when the sleeve 2 and shaft 1 are turned. The opening 2' is longer than the key 6, whereby movement of the shaft 1 and sleeve 2 along the axis of this shaft is permitted, such longitudinal movement of the shaft being possible with the shaft in any position to which it is turned. An insulating contact carrying block 7 is clamped between the sides of the clip 4 by the screw 5. The position of this block is further assured by causing the screw to pass through the block and also by forming an arcuate face in the bottom of the block which conforms in curvature to and receives the sleeve 2. This block carries a series of spring barrels 8, 9 and 10 which are distributed along the sleeve 2 and shaft 1 in the same plane and which are radial with respect to said sleeve and shaft. Coiled springs 11 are disposed in said spring barrels and enter the cylindrical continuations of contacts 12, 13 and 14 of the switching mechanism. These springs press these contacts radially outward and against the contacts 15, 16, 17, 18 and 19 or directly against the arcuate casing wall 20 which carries the latter contacts. The contacts 15, 16, 17, 18 and 19 are all engageable by the contact 13 being arranged in a plane transverse to the axis of the sleeve 2 and shaft 1. The contacts 15 and 19 are provided with continuations 21 and 22 which are positioned to be engageable by the contacts 14 and 12, respectively. The arcuate switch casing wall 20 is fixedly assembled with and between the switch casing walls 23 and 24. The U shaped clip 4 is snugly received at its ends between inward bearing continuations 23', 24' of the casing walls 23, 24. Such clip serves, through the intermediation of the key 6 thereon, to hold the switch casing in assembly with the shaft 1. The key 6 is also snugly received within a lateral opening in a sleeve 1' in which the sleeve 2 may be moved longitudinally. Sleeve 1' forms in bearings [illegible] the continuation 2 [illegible] movement of the [illegible] is prevented by means of brackets 26 [illegible] assemble the switch casing and inclined steering column 20.

The switch [illegible] shaft 1 passes through the interior of a hollow inclined steering shaft 28. This steering shaft carries a worm 29 which is in mesh with a wheel [illegible] unit controlling rotation with the [illegible] steering [illegible] wheels, in the case of [illegible] vehicles or other steering mechanism in the case of other vehicles. The hollow steering shaft 28 carries a hand operated steering wheel 30 at its upper end. The switch actuating shaft 1 passes through the [illegible] shaft 28 and beyond the upper end of the steering shaft and above the steering wheel 30. A lever 31 is coupled with the shaft 1' whereupon the shaft may be turned to adjust the lighting circuits of the automotive vehicle. The hub portion of this lever is aligned with the shaft 1 and constitutes a push button whereby this shaft may be depressed to operate the horn. The shaft 1 is held in its upper limiting position by means of a coiled spring 32 which is bottomed against the end wall of the sleeve 1'. I desire to employ a headed metallic plunger whose shank 34 is surrounded by the spring 32 and whose head 35 is pressed against the lever 2 and the shaft 1 to which this shaft is rigidly coupled. The shank of the plunger passes through the end wall of the sleeve 1' and is normally spaced apart from a contact flange 36 by the spring 35. When the shaft 1 is depressed against the force of the spring 32 the contact 34 engages the contact 36 to close the horn circuit. The contact 36 is carried by the switch casing wall 33 through the medium of [illegible] an insulating mounting block 37. A metallic sleeve 38 assembles the contact 36 with the block 37. An outwardly extending plug contact 39 is projected into a slot-like opening formed through an extension of the sleeve 38. A conductor which extends from the electromagnetic horn terminates in a metallic connecting plug 41 which is pressed into engagement with the contact 39. The circuits that are established [illegible] diagrammatically illustrated in Fig. 10 which illustrates the horn 42, the head lamps 43, the parking lamps 44, the tail lamp 45 and the generator battery 46 which is included in the [illegible] instrument [illegible] isolated from the switch therewith according to the adjustment of the manually operable switching members pertaining thereto. The circuit [illegible] is clearly illustrated and it is believed that a further description thereof will not be essential. The switching mechanism is located above the common axis of the inclined steering column and steering shaft, the arcuate wall 20 of the casing for the switching mechanism being coaxial with said column and shaft. Access of foreign matter to the switching mechanism is thus effectively guarded against.

The hollow steering shaft 28 is illustrated as enclosing other controlling shafts which do not enter into the present invention, a description thereof being, therefore, not necessary.

Changes may be made without departing from the invention.

Having thus described my invention, I claim:

1. In a switching mechanism, the combination with a shaft; of a casing in which the shaft rotates and reciprocates; a plurality of contacts arranged in an arc at one side of the axis of the shaft and in a plane transverse to the axis of the shaft; said contacts being spaced from said shaft a distance substantially greater than the diameter of the shaft; a contact carrier fixed to rotate with said shaft but permitting reciprocation of the shaft therein; and a contact carried by said carrier and engageable selectively with said first mentioned contacts upon rotation of the shaft.

2. In a switching mechanism, the combination with a casing; of a sleeve rotatable in the casing, said sleeve having a wall at one end thereof; another sleeve in said first sleeve but terminating short of the walled end of the first sleeve, said second sleeve being keyed to said first sleeve for rotation therewith but movable longitudinally of said first sleeve; a plunger between said second sleeve and the walled end of the first sleeve, said plunger extending through an aperture in said wall to engage a contact fixed with respect to the casing; and a coil spring between said wall and said second sleeve tending to retract said plunger and said second sleeve to separate said plunger and the contact.

3. In a switching mechanism, the combination with a casing; of a sleeve rotatable in the casing, said sleeve having a wall at one end thereof; another sleeve in said first sleeve but terminating short of the walled end of the first sleeve, said second sleeve being keyed to said first sleeve for rotation therewith but movable longitudinally of said first sleeve; a plunger between said second sleeve and the walled end of the first sleeve, said plunger extending through an aperture in said wall to engage a contact fixed with respect to the casing; a coil spring between said wall and said second sleeve tending to retract said plunger and said second sleeve to separate said plunger and the contact; and a contact carried on said first sleeve in said casing and keyed to rotate with said sleeve.

HARRY A. DOUGLAS.